(12) United States Patent
Wang

(10) Patent No.: US 12,078,195 B2
(45) Date of Patent: Sep. 3, 2024

(54) FASTENER STRUCTURE

(71) Applicant: Ting-Jui Wang, New Taipei (TW)

(72) Inventor: Ting-Jui Wang, New Taipei (TW)

( * ) Notice: Subject to any disclaimer, the term of this patent is extended or adjusted under 35 U.S.C. 154(b) by 1111 days.

(21) Appl. No.: 16/896,188

(22) Filed: Jun. 8, 2020

(65) Prior Publication Data

US 2021/0131471 A1 May 6, 2021

(30) Foreign Application Priority Data

Nov. 6, 2019 (TW) ................ 108140322

(51) Int. Cl.
*F16B 5/10* (2006.01)
*F16B 5/08* (2006.01)
*F16B 17/00* (2006.01)

(52) U.S. Cl.
CPC .............. *F16B 17/008* (2013.01); *F16B 5/08* (2013.01); *F16B 5/10* (2013.01)

(58) Field of Classification Search
CPC ...... F16B 5/08; F16B 5/10; F16B 2/18; F16B 2/185; F16B 21/02; F16B 21/04
See application file for complete search history.

(56) References Cited

U.S. PATENT DOCUMENTS

| 3,402,958 | A | * | 9/1968 | Barry | E05C 3/042 |
| | | | | | 292/62 |
| 5,361,925 | A | * | 11/1994 | Wecke | H02G 3/14 |
| | | | | | 220/325 |
| 5,779,422 | A | * | 7/1998 | Petignat | F16B 39/28 |
| | | | | | 411/553 |
| 5,885,022 | A | * | 3/1999 | Maughan | F16C 11/0642 |
| | | | | | 403/135 |
| 10,294,971 | B2 | * | 5/2019 | Wu | F16B 5/0635 |
| 2003/0156923 | A1 | * | 8/2003 | Winkler | F16B 7/105 |
| | | | | | 411/552 |
| 2004/0083586 | A1 | * | 5/2004 | Bentrim | F16B 19/109 |
| | | | | | 24/458 |
| 2011/0123291 | A1 | * | 5/2011 | Chiu | F16B 5/0208 |
| | | | | | 411/342 |

(Continued)

FOREIGN PATENT DOCUMENTS

| CN | 201271492 Y | 7/2009 |
| CN | 208044486 U | 11/2018 |

(Continued)

*Primary Examiner* — Daniel J Wiley

(57) ABSTRACT

A fastener structure includes a head portion, rod member and fitting member. The head portion has a lateral holding portion and vertical receiving portion. The rod member has a lateral attaching portion and engaging member. The rod member is penetratingly disposed at the receiving portion to allow the attaching portion to correspond in position to the holding portion. The fitting member is penetratingly disposed at the attaching portion and the holding portion to fit the head portion and the rod member together. To couple two objects together, the head portion drives an engaging portion of the rod member, such that the engaging portion penetrates one object before being fastened to the other object. To unfasten the objects, the head portion is moved reversely to remove the engaging portion from the other object, effecting separation of the objects, so as to achieve quick coupling and easy unfastening.

40 Claims, 24 Drawing Sheets

(56) References Cited

U.S. PATENT DOCUMENTS

| | | | | |
|---|---|---|---|---|
| 2012/0301244 A1* | 11/2012 | Chiu | .................. | F16B 21/02 |
| | | | | 411/166 |
| 2013/0183086 A1* | 7/2013 | Wang | .................. | F16B 5/0642 |
| | | | | 403/327 |
| 2014/0093326 A1* | 4/2014 | Wang | .................. | F16B 5/0208 |
| | | | | 411/103 |
| 2014/0105707 A1* | 4/2014 | Tseng | .................. | F16B 21/04 |
| | | | | 411/508 |
| 2016/0003271 A1* | 1/2016 | Wang | .................. | G06F 1/184 |
| | | | | 403/322.4 |
| 2017/0074303 A1* | 3/2017 | Bowers | .................. | F16B 5/10 |
| 2017/0102017 A1* | 4/2017 | Wang | .................. | F16B 5/02 |
| 2017/0146050 A1* | 5/2017 | Wang | .................. | F16B 39/284 |
| 2017/0320674 A1* | 11/2017 | Wang | .................. | F16C 29/046 |
| 2018/0202481 A1* | 7/2018 | Wu | .................. | F16B 21/02 |

FOREIGN PATENT DOCUMENTS

| | | | |
|---|---|---|---|
| CN | 208885705 U | 5/2019 | |
| CN | 209041248 U | 6/2019 | |
| TW | M552221 U | 11/2017 | |
| TW | M575482 U | 3/2019 | |

* cited by examiner

FASTENER STRUCTURE

CROSS-REFERENCE TO RELATED APPLICATION

This non-provisional application claims priority under 35 U.S.C. § 119(a) on Patent Application No(s). 108140322 filed in Taiwan, R.O.C. on Nov. 6, 2019, the entire contents of which are hereby incorporated by reference.

BACKGROUND OF THE INVENTION

1. Field of the Invention

The present disclosure relates to fastener structures, and in particular to a fastener structure capable of fastening at least two objects in place to achieve quick coupling and easy unfastening.

2. Description of the Related Art

Conventionally, coupling together two objects requires fastening the two objects together with screws in an inseparable manner to ensure that the two objects are firmly coupled together and thus cannot be easily separated.

Although the aforesaid prior art is effective in coupling together two objects to render them inseparable, the aforesaid prior art not only fails to render the coupling process easy but its use of screws also renders the two objects difficult to unfasten.

Therefore, it is important to provide a fastener structure with simple structure and ease of use to overcome drawbacks of the prior art.

BRIEF SUMMARY OF THE INVENTION

An objective of the present disclosure is to provide a fastener structure capable of quick coupling and easy unfastening.

To achieve at least the above objective, the present disclosure provides a fastener structure, comprising: a head portion having a receiving portion and a holding portion; a rod member having an engaging portion and an attaching portion and penetratingly disposed at the receiving portion, the attaching portion corresponding in position to the holding portion; and a fitting member penetratingly disposed at the attaching portion and the holding portion.

Regarding the fastener structure, the head portion is round, handle-shaped, drop-shaped, wing-shaped, polyhedral, step-shaped or flaring.

Regarding the fastener structure, the receiving portion of the head portion is a vertical, transverse or lateral penetrating hole or recess portion.

Regarding the fastener structure, the holding portion of the head portion or the attaching portion of the rod member is a lateral, vertical or transverse penetrating hole or recess portion.

Regarding the fastener structure, the holding portion of the head portion or the attaching portion of the rod member is a lateral penetrating hole.

Regarding the fastener structure, a holding portion of the head portion has a recess portion for receiving an expanding portion or a stopping portion of the fitting member.

Regarding the fastener structure, a top surface of the rod member has a force-applying portion whereby a tool operates.

Regarding the fastener structure, an engaging portion of the rod member is a cylindrical member, thread member, outer engaging member or inner engaging member.

Regarding the fastener structure, the engaging portion of the rod member penetrates a first object before being fastened to a second object.

Regarding the fastener structure, the fitting member is a rod member, engaging member, resilient member or expanding member.

Regarding the fastener structure, the fitting member has a stopping portion or an expanding portion.

The fastener structure further comprises a resilient component for use in movable fitting or fixed fitting.

The fastener structure further comprises a body portion for use in movable fitting.

Regarding the fastener structure, the body portion has a fitting portion adapted to be fitted to a first object or integrally formed with the first object.

Regarding the fastener structure, the diameter of the fitting portion is greater than, less than or equal to the diameter of the head portion.

Regarding the fastener structure, the fitting portion is fitted to the first object by riveting, expanding, welding, fastening, adhering or soldering.

Regarding the fastener structure, the head portion or the body portion has a checking portion for checking and being fitted to each other or for checking and being fitted to the rod member.

The fastener structure further has a resilient component having an end abutting against the head portion and another end abutting against the body portion, or having an end abutting against the body portion and another end abutting against the rod member or the engaging portion.

Regarding the fastener structure, the body portion has an inner thread, and the engaging portion is an outer thread, such that, owing to coordination of the inner thread and the outer thread, the checking portion of the head portion is insertedly engaged with the checking portion of the body portion.

Regarding the fastener structure, the fastener structure is disposed in a carrier.

Regarding the fastener structure, the carrier has a cover.

Regarding the fastener structure, the head portion further has a handle portion or an operating portion.

Regarding the fastener structure, the rod member penetrates and exits an internal hole of the body portion, such that the attaching portion penetrates and exits the body portion, wherein, after the attaching portion has been fitted to the head portion, the fitting member is insertedly disposed in the attaching portion for fitting, such that the rod member is movably fitted to the body portion.

Regarding the fastener structure, the head portion or the body portion has a shoulder space for receiving a resilient component.

Regarding the fastener structure, the width of the rod member is greater than, equal to or less than the width of a blocking portion of the engaging portion. The blocking portion is blocked at an internal hole of the body portion, such that the rod member is movably fitted to the body portion.

Regarding the fastener structure, the body portion has a pressed portion adapted to be pressed or pushed, such that a fitting portion of the body portion presses or abuts against a first object, allowing material of the first object to enter or flow into a material storage space of the fitting portion, so as for the body portion to be fitted to the first object.

Regarding the fastener structure, the body portion is of greater hardness than the first object.

Regarding the fastener structure, the body portion has a pressed portion adapted to be pressed or pushed, such that a fitting portion of the body portion is expanded and fitted to a first object when pressed under an applied force.

Regarding the fastener structure, the fastener structure is disposed in a carrier, taken out of the carrier with a tool, compared with a comparison device, and precisely placed on a first object for fitting.

Regarding the fastener structure, the head portion or the body portion of the fastener structure has a weldable surface weldable to a weldable surface of the first object.

Regarding the fastener structure, solder portions are disposed between the body portion and the first object and adapted to be heated to change to a liquid state and then cooled to change to a solid state, such that the body portion and the first object are fitted to each other.

Regarding the fastener structure, the tool is a vacuum suction device or a clamp, and the first object is a PCB, a metal board or a plastic board.

The fastener structure further comprises a torsion spring. The torsion spring has an end blocked at the head portion and another end blocked at the body portion, or has an end blocked at the body portion and another end blocked at the rod member, such that the head portion or the rod member rotates to and fro because of resilience of the torsion spring.

Regarding the fastener structure, the pressed portion is disposed beside the head portion, the rod member or the fitting member and is of a greater width than the head portion, the rod member or the fitting member.

Regarding the fastener structure, the head portion rotates about the fitting member to drive the rod member moving and thereby creating a pressed space of the pressed portion.

Regarding the fastener structure, the head portion rotates about the fitting member to drive the rod member moving.

Regarding the fastener structure, the head portion has a blocking portion, and the body portion has a corresponding blocking portion, such that the blocking portion and the corresponding blocking portion block each other to limit the rotation or lateral movement of the head portion.

Regarding the fastener structure, the blocking portion or the corresponding blocking portion is a raised portion, dented portion, stepped portion, oblique surface portion, curved surface portion, arcuate surface portion or flatted surface portion.

Regarding the fastener structure, the body portion has a pressed portion adapted to be pressed or pushed, such that the body portion is fitted to the first object.

Regarding the fastener structure, the rod member has a blocking portion, and the body portion has a corresponding blocking portion, such that the blocking portion and the corresponding blocking portion block each other to limit the rotation or lateral movement of the head portion.

Regarding the fastener structure, the blocking portion is a tetrahedron or polyhedron, and the corresponding blocking portion is a tetrahedron or polyhedron; or the blocking portion is a blocking raised member, and the corresponding blocking portion is a corresponding blocking dented member; or the blocking portion is a blocking dented member, and the corresponding blocking portion is a corresponding blocking raised member.

Regarding the fastener structure, the head portion has a tool control portion which comprises the rod member and the fitting member.

The fastener structure further comprises a tool corresponding in position to the tool control portion to control the fastener structure.

Regarding the fastener structure, the tool is a vacuum suction device, and the head portion is an airtight structure disposed above the rod member, such that the fastener structure is attracted to the vacuum suction device by suction.

Regarding the fastener structure, the tool control portion is the space within the head portion, disposed on two sides of the fitting member, and lower than the upper end of the head portion.

Regarding the fastener structure, the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and thus cooled and solidified to form the head portion.

Therefore, the fastener structure of the present disclosure works as follows: to couple two objects together, the head portion drives the engaging portion of the rod member, such that the engaging portion penetrates the first object before being fastened to the second object. To unfasten the two objects, the user moves the head portion reversely, such that the engaging portion is removed from the second object, effecting separation of the first object and the second object, so as to achieve quick coupling and easy unfastening.

DETAILED DESCRIPTION OF THE INVENTION

Figure 1:
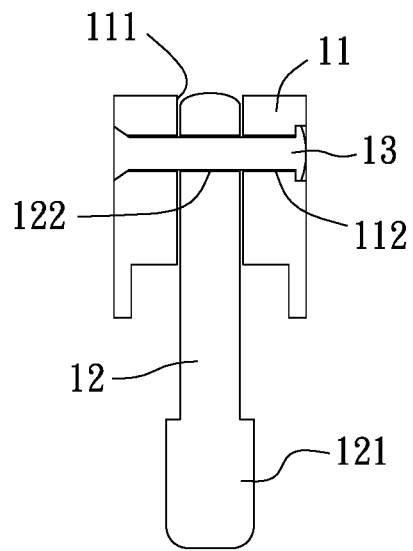
FIG. 1 is a cross-sectional view of embodiment 1 of the present disclosure.
Figure 2:
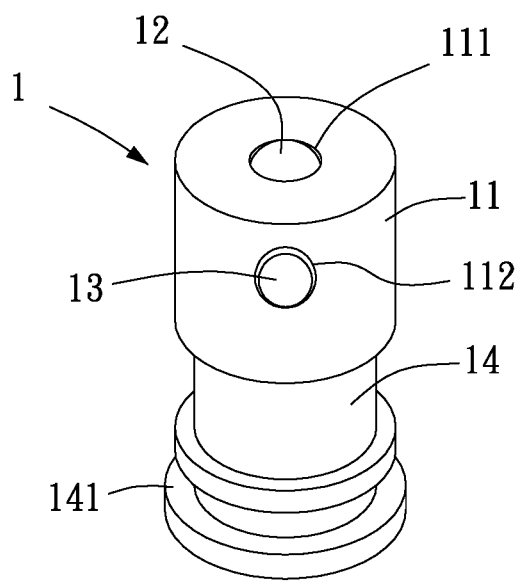
FIG. 2 is a perspective view of embodiment 2 of the present disclosure.
Figure 3:
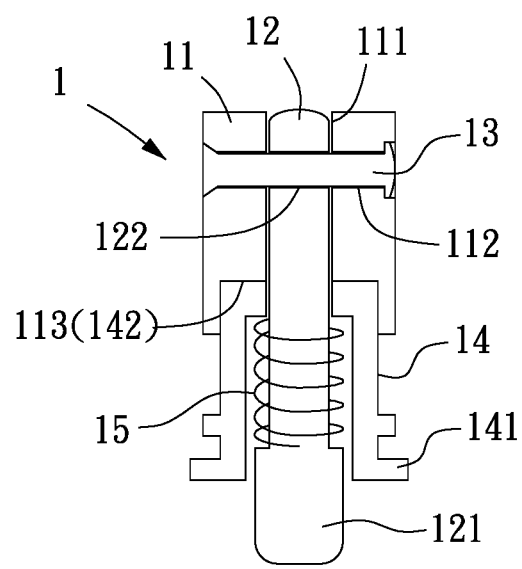
FIG. 3 is a cross-sectional view of embodiment 2 of the present disclosure.
Figure 4:
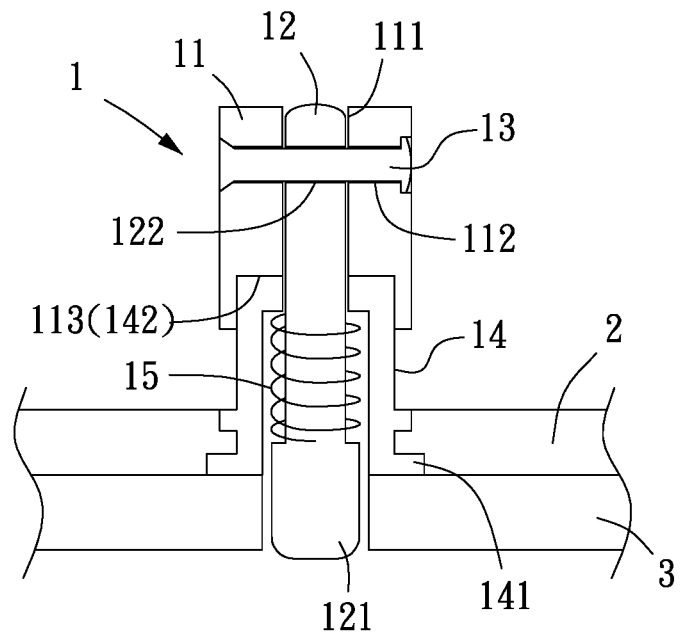
FIG. 4 is a schematic view of usage state of embodiment 2 of the present disclosure.
Figure 5:
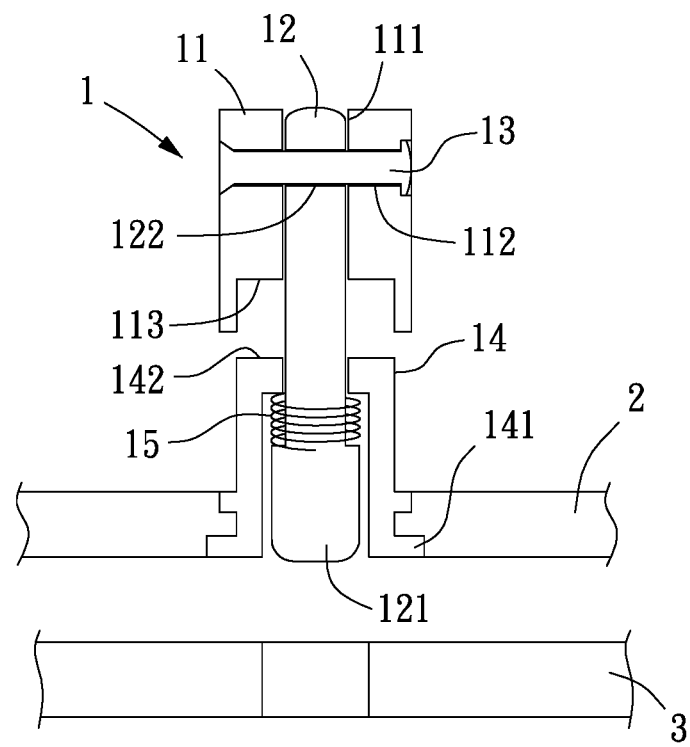
FIG. 5 is a schematic view of usage state of embodiment 2 of the present disclosure.

To facilitate understanding of the object, characteristics and effects of this present disclosure, embodiments together with the attached drawings for the detailed description of the present disclosure are provided.

Referring to FIG. 1 through FIG. 5, a fastener structure 1 of the present disclosure essentially comprises a head portion 11, a rod member 12 and a fitting member 13.

The head portion 11 has a receiving portion 111 and a holding portion 112. The head portion 11 is round, handle-shaped, drop-shaped, wing-shaped, polyhedral, step-shaped or flaring, as needed.

The rod member 12 has an engaging portion 121 and an attaching portion 122. The rod member 12 is penetratingly disposed at the receiving portion 111 and causes the attaching portion 122 to correspond in position to the holding portion 112. The engaging portion of the rod member is a cylindrical member, thread member, outer engaging member or inner engaging member as needed.

The fitting member 13 is penetratingly disposed at the attaching portion 122 and the holding portion 112. The head portion 11 and the rod member 12 are fixed to each other. The fitting member is a rod member, engaging member, resilient member or expanding member.

The receiving portion 111 of the head portion 11 is a vertical, transverse or lateral penetrating hole or recess portion. The holding portion 112 of the head portion 11 and the attaching portion 122 of the rod member 12 are lateral, vertical or transverse penetrating holes or recess portions. In this embodiment, the holding portion 112 of the head portion 11 and the attaching portion 122 of the rod member 12 are lateral penetrating holes.

The fastener structure 1 further comprises a body portion 14 movably fitted to the head portion 11. The body portion 14 has a fitting portion 141. The outer diameter of the fitting portion 141 is greater than, less than or equal to the outer diameter of the head portion 11. The head portion 11 and the body portion 14 have checking portions 113, 142, respectively, for checking and being fitted to each other. The fastener structure 1 further has a resilient component 15 for use in movable fitting or fixed fitting.

Assembly of the fastener structure 1 at least requires the following steps:

Step 1: inserting the rod member 12 into the receiving portion 111 of the head portion 11.

Step 2: aligning the attaching portion 122 of the rod member 12 with the holding portion 112 of the head portion 11.

Step 3: inserting fitting member 13 into the holding portion 112 and the attaching portion 122, such that the fitting member 13 fits the head portion 11 and the rod member 12 together.

Mounting the body portion 14 in place requires the checking portion 142 of the body portion 14 and the checking portion 113 of the head portion 11 (or rod member 12) to check each other, such that the body portion 14 is movably fitted to the head portion 11. Before the head portion 11 and the rod member 12 are mounted in place, or before the body portion 14 and the head portion 11 are mounted in place, the resilient component 15 is fitted around the rod member 12, such that the resilient component 15 has one end abutting against the body portion 14 and the other end abutting against the engaging portion 121 of the rod member 12.

Starting to use the fastener structure entails fitting the fitting portion 141 of the body portion 14 to a first object 2 by riveting, expanding, welding, fastening, adhering or soldering, or allowing the fitting portion 141 of the body portion 14 to be integrally formed with the first object 2. Then, the user exerts a pulling force on the head portion 11, such that the head portion 11 drives the engaging portion 121 of the rod member 12 upward to thereby compress the resilient component 15. After that, the user places a second object 3 on the first object 2 and then releases the head portion 11, such that the resilient component 15 is released to thereby push the engaging portion 121 (and drive the head portion 11); thus, the engaging portion 121 of the rod member 12 penetrates the first object 2 before being fastened to the second object 3.

To unfasten the first object 2 and the second object 3, the user pulls the head portion 11 again, such that the head portion 11 drives the engaging portion 121 of the rod member 12 upward to thereby compress the resilient component 15. At this point in time, the engaging portion 121 separates from the second object 3, thereby causing separation of the first object 2 and the second object 3. Therefore, the present disclosure achieves quick coupling and easy unfastening.

Figure 6:
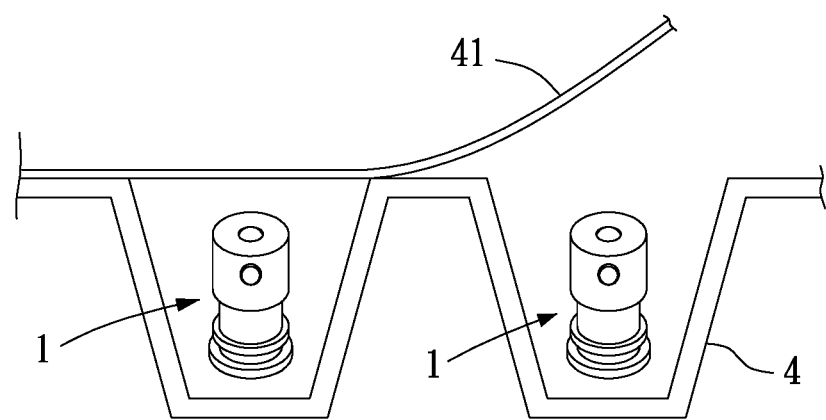
FIG. 6 is a schematic view of storage of a fastener structure of the present disclosure.

Referring to FIG. 6, in this embodiment, a plurality of fastener structures 1 are disposed in a carrier 4, and the carrier 4 has a cover 41. Therefore, storage of the fastener structure 1 is effected.

Figure 7:
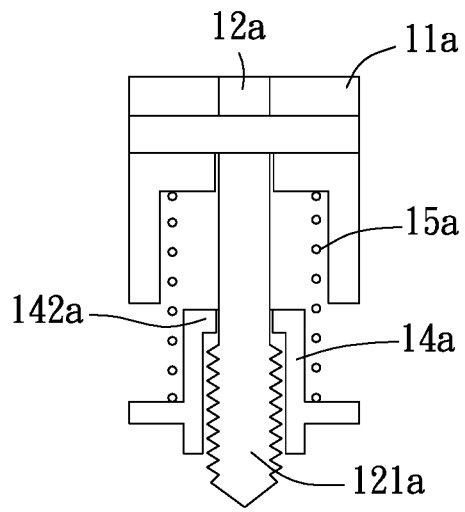
FIG. 7 is a cross-sectional view of embodiment 3 of the present disclosure.

Referring to FIG. 7, in this embodiment, the engaging portion 121a of the rod member 12a is an outer thread. The resilient component 15a has one end abutting against the head portion 11a and the other end abutting against the body portion 14a. The checking portion 142a of the body portion 14a and the rod member 12a check each other and is fitted to each other.

Figure 8:
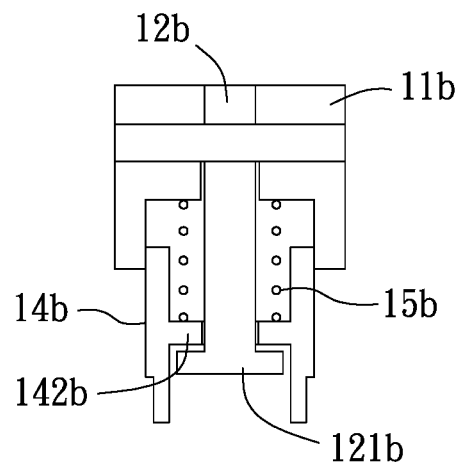
FIG. 8 is a cross-sectional view of embodiment 4 of the present disclosure.

Referring to FIG. 8, in this embodiment, the engaging portion 121b of the rod member 12b is an outer engaging member. The resilient component 15b has one end abutting against the head portion 11b and the other end abutting against the checking portion 142b of the body portion 14b. The checking portion 142b of the body portion 14b and the rod member 12b check each other.

Figure 9:
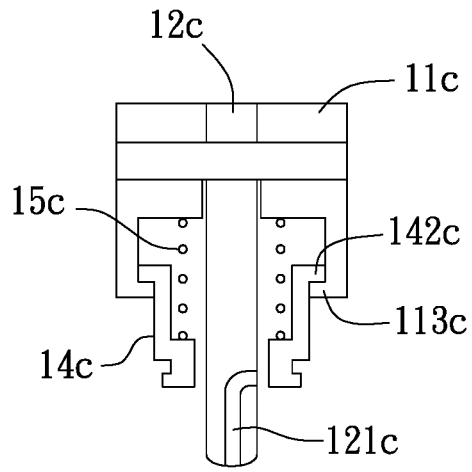
FIG. 9 is a cross-sectional view of embodiment 5 of the present disclosure.

Referring to FIG. 9, in this embodiment, the engaging portion 121c of the rod member 12c is an inner engaging member. The resilient component 15c has one end abutting against the head portion 11c and the other end abutting against the body portion 14c. The checking portion 113c of the head portion 11c and the checking portion 142c of the body portion 14c check each other. In this embodiment, the checking portion 113c of the head portion 11c and the checking portion 142c of the body portion 14c are engaging members fastened to each other.

Figure 10:
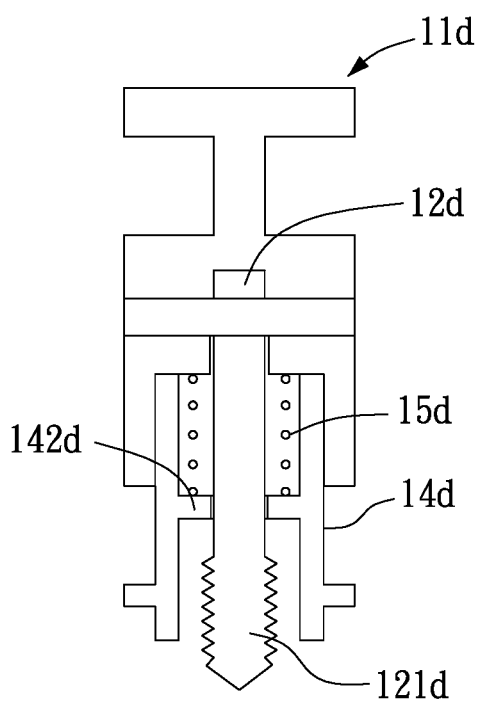
FIG. 10 is a cross-sectional view of embodiment 6 of the present disclosure.

Referring to FIG. 10, in this embodiment, the head portion 11d is a handle, whereas the engaging portion 121d of the rod member 12d is an outer thread. The resilient component 15d has one end abutting against the head portion 11d and the other end abutting against the body portion 14d. The checking portion 142d of the body portion 14d and the rod member 12d check each other.

Figure 11:
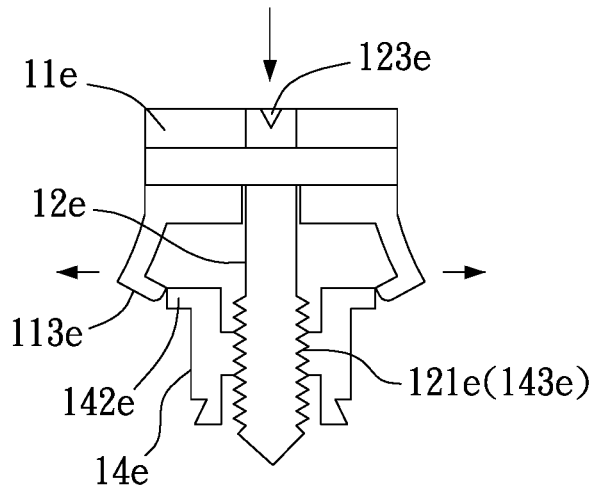
FIG. 11 is a cross-sectional view of embodiment 7 of the present disclosure.
Figure 12:
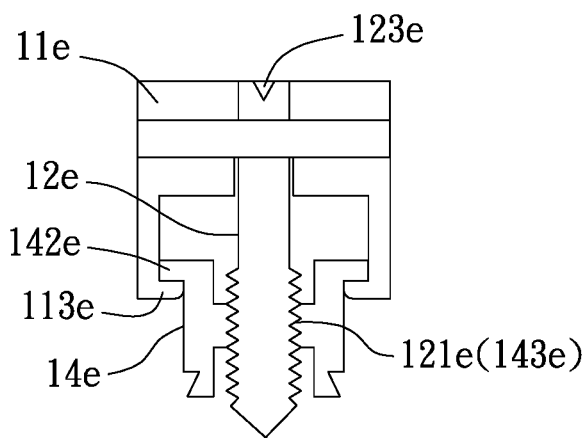
FIG. 12 is a cross-sectional view of embodiment 7 of the present disclosure.

Referring to FIG. 11 and FIG. 12, in this embodiment, the checking portion 113e of the head portion 11e is a resilient member and is deformed under an applied force to thereby insertedly engage with the checking portion 142e of the body portion 14e, such that the head portion 11e is movably fitted to the body portion 14e. The top surface of the rod member 12e has a force-applying portion 123e, such that a tool (not shown) can operate. The body portion 14e has an inner thread 143e. The engaging portion 121e is an outer thread. Owing to coordination of the inner thread 143e and the outer thread of the engaging portion 121e, the checking portion 113e of the head portion 11e is insertedly engaged with the checking portion 142e of the body portion 14e.

Figure 13:
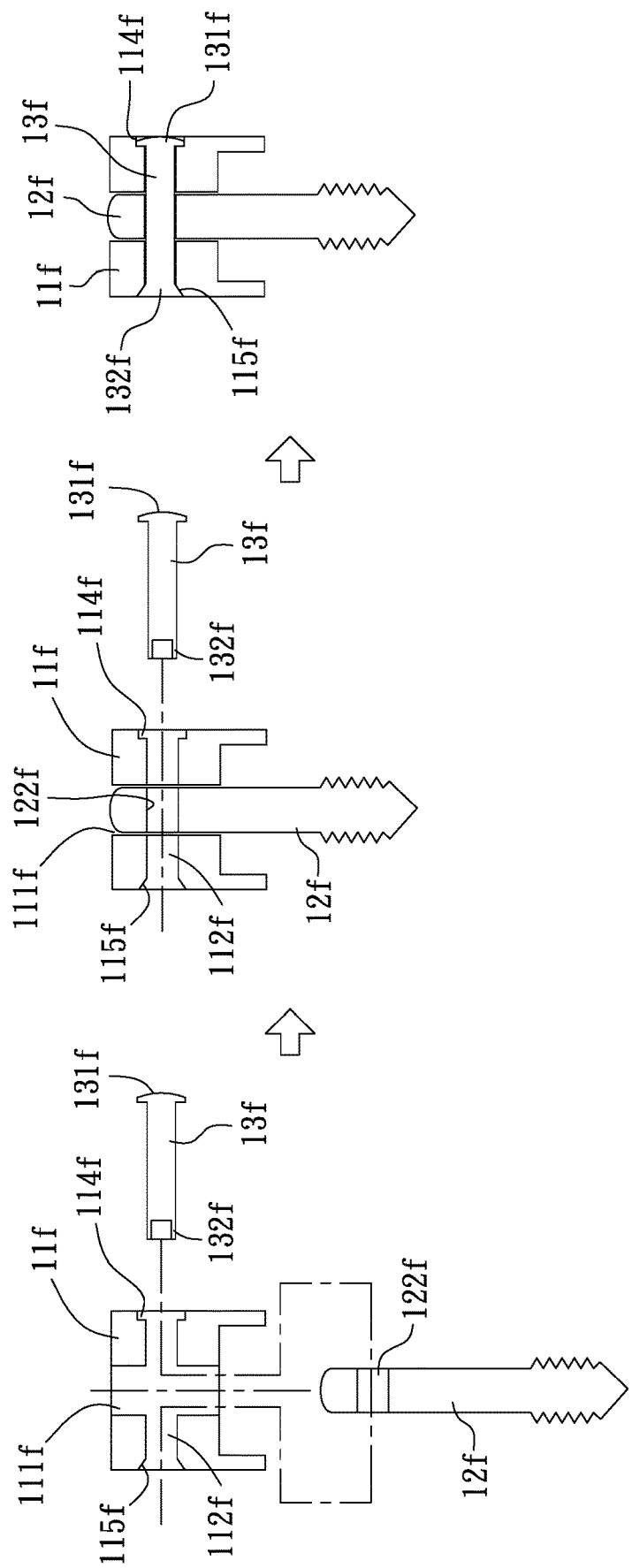
FIG. 13 is a cross-sectional view of embodiment 8 of the present disclosure.

Referring to FIG. 13, in this embodiment, two ends of the holding portion 112f of the head portion 11f have recess portions 114f, 115f, respectively. The fitting member 13f has one end having a stopping portion 131f and the other end having an expanding portion 132f. The recess portions 114f, 115f store the stopping portion 131f and the expanding portion 132f at the two ends of the fitting member 13f, respectively.

Assembly of the fastener structure entails insertedly disposing the rod member 12f in the receiving portion 111f of the head portion 11f to allow the attaching portion 122f of the rod member 12f to correspond in position to the holding portion 112f of the head portion 11f, insertedly disposing the fitting member 13f in the holding portion 112f and the attaching portion 122f, fitting the head portion 11f and the rod member 12f together by the fitting member 13f, blocking the stopping portion 131f of the fitting member 13f by the recess portion 114f of the head portion 11f, and allowing the expanding portion 132 of the fitting member 13f to expand and deform under an applied force expanding so as to be blocked by another recess portion 115f of the head portion 11f.

Figure 14:
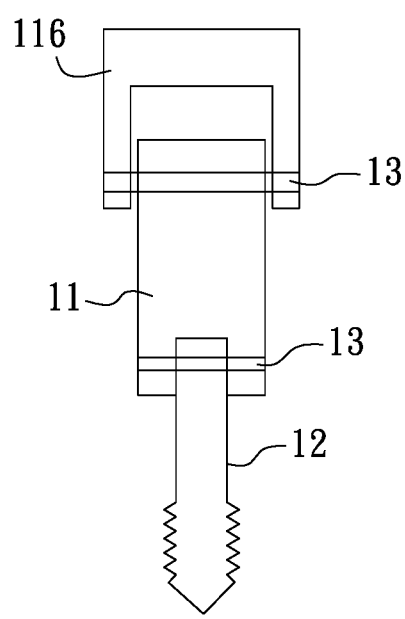
FIG. 14 is a cross-sectional view of embodiment 9 of the present disclosure.
Figure 15:
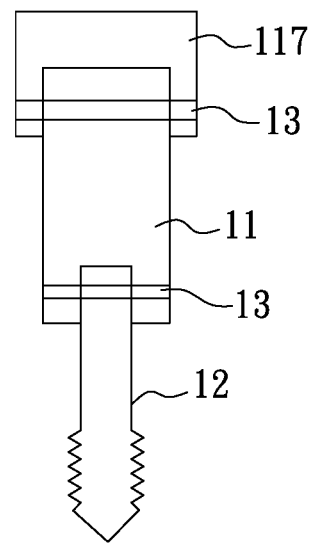
FIG. 15 is a cross-sectional view of embodiment 10 of the present disclosure.

Referring to FIG. 14 and FIG. 15, in this embodiment, the head portion 11 further has a handle portion 116 (shown in FIG. 14), or the head portion 11 further has an operating portion 117 (shown in FIG. 15). Therefore, to start using the fastener structure, the handle portion 116 or the operating portion 117 exerts a force on the head portion 11, such that the head portion 11 drives the rod member 12 fastening in place. Therefore, the present disclosure meets practical operation-related and usage-related needs.

Figure 16:
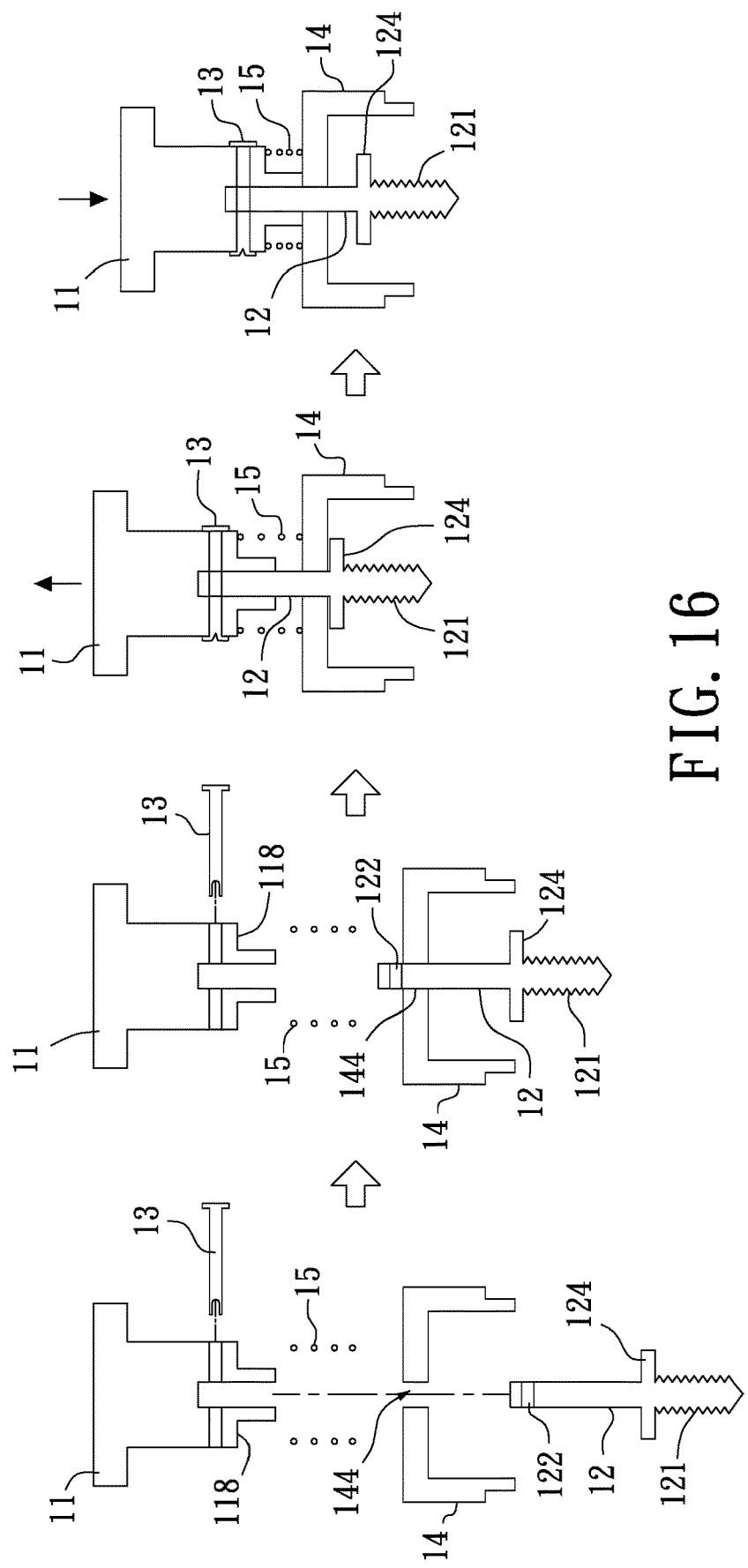
FIG. 16 is a schematic view of assembly state of embodiment 11 of the present disclosure.

Referring to FIG. 16, in this embodiment, the rod member 12 penetrates and exits an internal hole 144 of the body portion 14, such that the attaching portion 122 penetrates and exits the body portion 14. After the attaching portion 122 has been fitted to the head portion 11, the fitting member 13 is insertedly disposed in the attaching portion 122, such that the rod member 12 is movably fitted to the body portion 14. The head portion 11 has a shoulder space 118. The shoulder space 118 receives a resilient component 15. The rod member 12 is of a width greater than (equal to or less than) the width of a blocking portion 124 of the engaging portion 121. The blocking portion 124 is blocked at an internal hole 144 of the body portion 14, such that the rod member 12 is movably fitted to the body portion 14. Therefore, to start using the fastener structure, the user exerts a force on the head portion 11, such that the head portion 11 drives the engaging portion 121 of the rod member 12 downward to thereby compress the resilient component 15; thus, the engaging portion 121 is fastened to the second object (not shown). To unfasten the engaging portion 121, the user exerts a force on the head portion 11 again, such that the head portion 11 drives the engaging portion 121 of the rod member 12 moving and releases the resilient component 15 to thereby separate the engaging portion 121 from the second object, so as to achieve quick coupling and easy unfastening.

Figure 17:
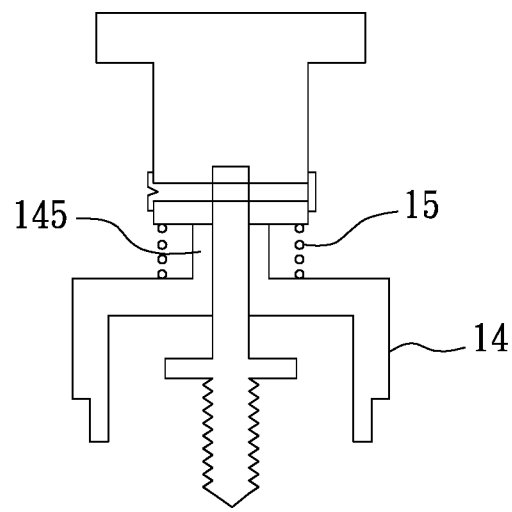
FIG. 17 is a cross-sectional view of embodiment 12 of the present disclosure.

Referring to FIG. 17, in this embodiment, the body portion 14 has a shoulder space 145. The shoulder space 145 contains a resilient component 15 Therefore, the present disclosure meets practical operation-related and usage-related needs.

Figure 18:
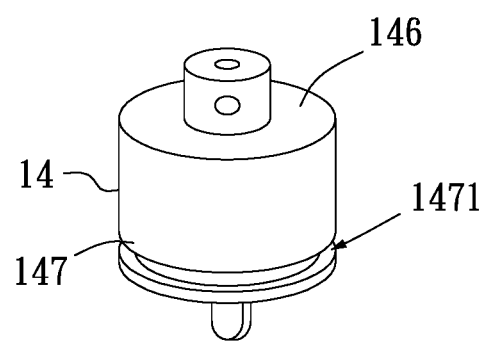
FIG. 18 is a perspective view of embodiment 13 of the present disclosure.
Figure 19:
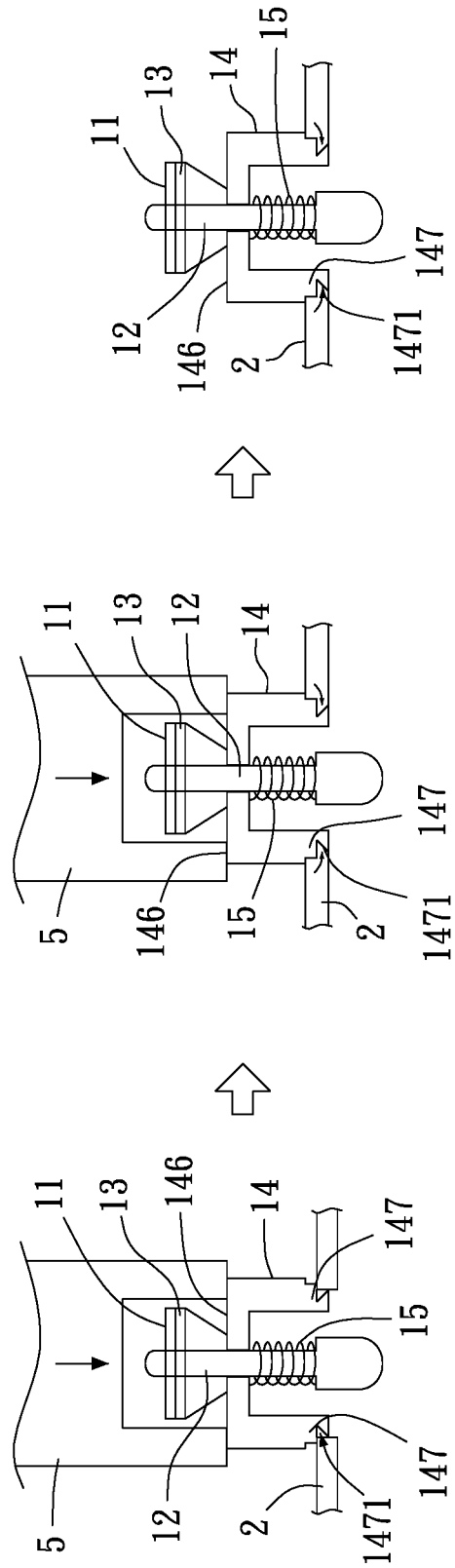
FIG. 19 is a schematic view of assembly state of embodiment 13 of the present disclosure.

Referring to FIG. 18 and FIG. 19, in this embodiment, the body portion 14 has a pressed portion 146. A tool 5 has a recess to receive the head portion 11. The tool 5 directly presses or abuts against the pressed portion 146 under an applied force, such that a fitting portion 147 of the body portion 14 presses a first object 2; thus, the material of the first object 2 enters or flows into a material storage space 1471 of the fitting portion 147 to allow the body portion 14 to be fitted to the first object 2. The body portion 14 is of greater hardness than the first object 2. Therefore, the body portion 14 is firmly fitted to the first object 2 to facilitate subsequent related operation.

Figure 20:
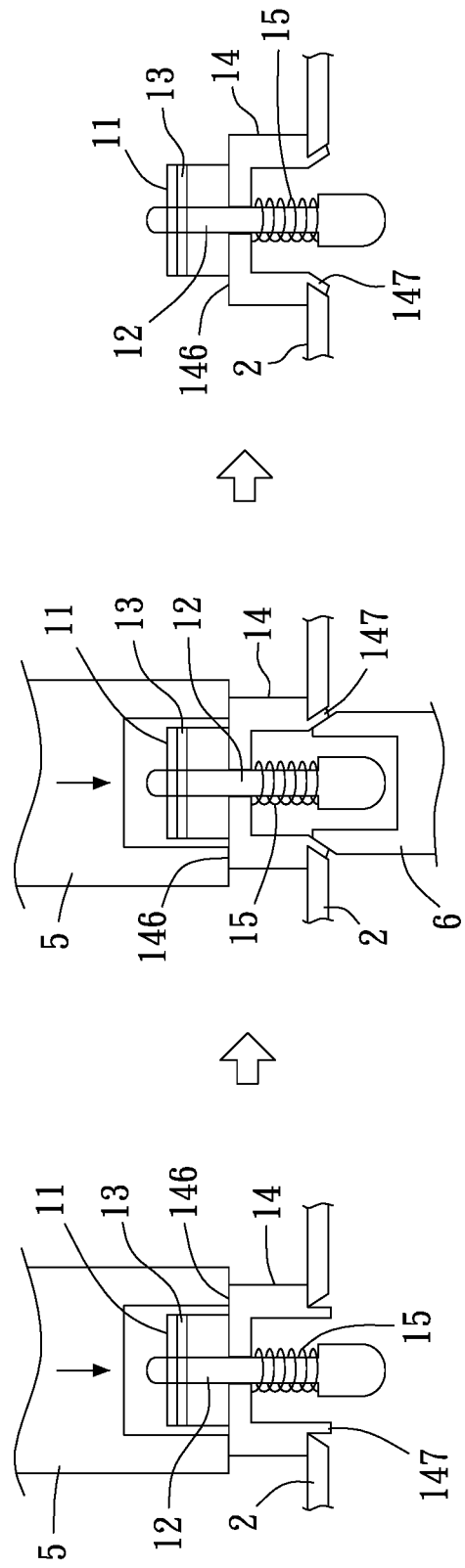
FIG. 20 is a schematic view of assembly state of embodiment 14 of the present disclosure.

Referring to FIG. 20, in this embodiment, the body portion 14 has a pressed portion 146. A tool 5 presses or abuts against the pressed portion 146 under an applied force, such that a fitting portion 147 of the body portion 14 is expanded and fitted to a first object 2 when pressed by another tool 6 under an applied force, thereby allowing the body portion 14 to be fitted to the first object 2. Therefore, the body portion 14 is firmly fitted to the first object 2 to facilitate subsequent related operation.

Figure 21:
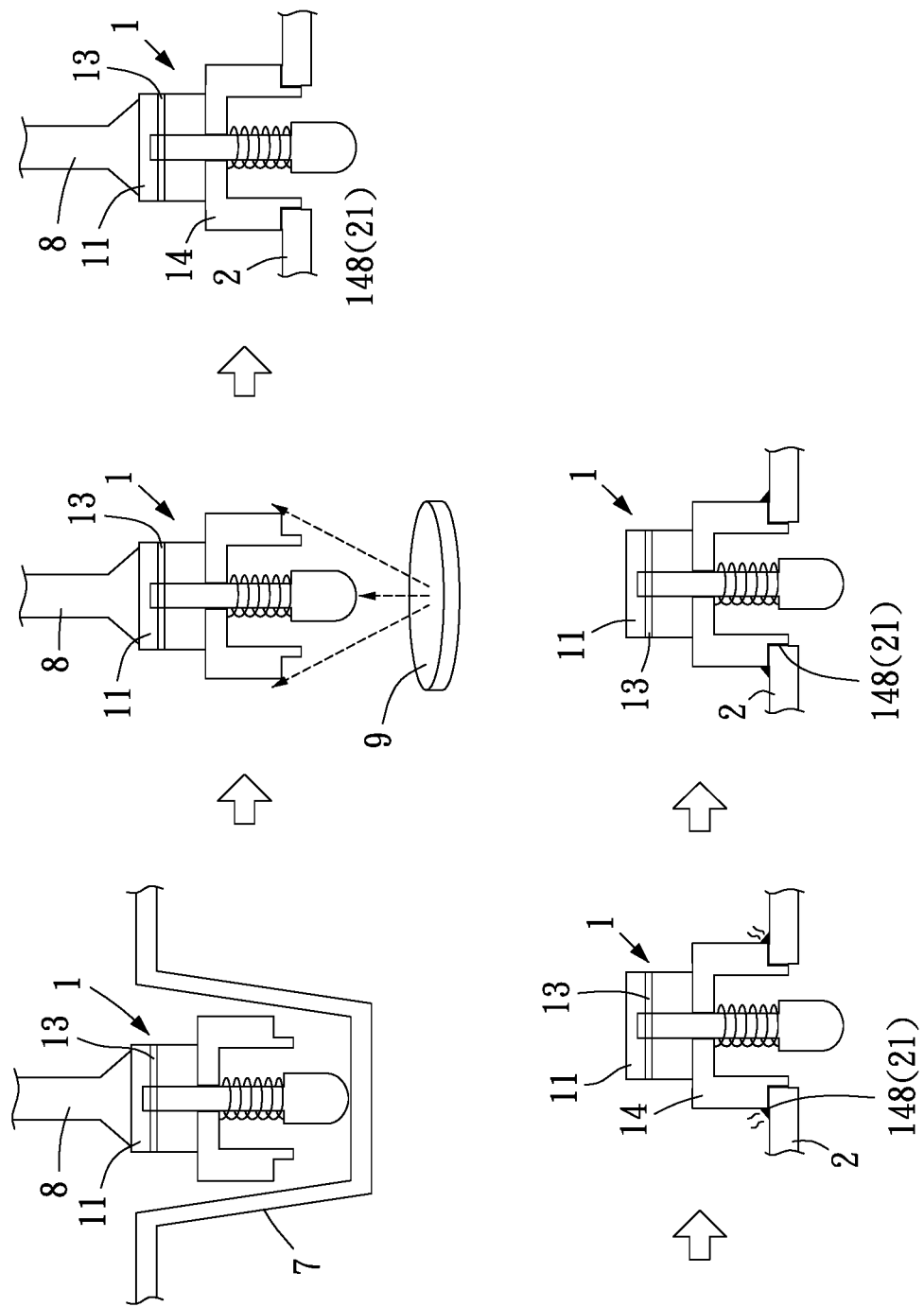
FIG. 21 is a schematic view of assembly state of embodiment 15 of the present disclosure.

Referring to FIG. 21, in this embodiment, the fastener structure 1 is disposed in a carrier 7. The fastener structure 1 is taken out of the carrier 7 with a tool 8 and then compared with a comparison device 9. After that, the fastener structure 1 is precisely placed on a first object 2 for fitting. In this embodiment, the body portion 14 (or head portion 11) of the fastener structure 1 has a weldable surface 148 weldable to a weldable surface 21 of the first object 2. The weldable surfaces 148, 21 are solder portions between the body portion 14 and the first object 2. The solder portions are heated to change to a liquid state and then cooled to change to a solid state; thus, the body portion 14 and the first object 2 are fitted to each other. The tool 8 is a vacuum suction device or a clamp. The first object is a PCB, a metal board or a plastic board. Therefore, the body portion 14 is firmly fitted to the first object 2 to facilitate subsequent related operation.

The tool 8 is a vacuum suction device. The head portion 11 is an airtight structure disposed above the rod member 12, such that the fastener structure 1 is attracted to the vacuum suction device by suction.

Figure 24:
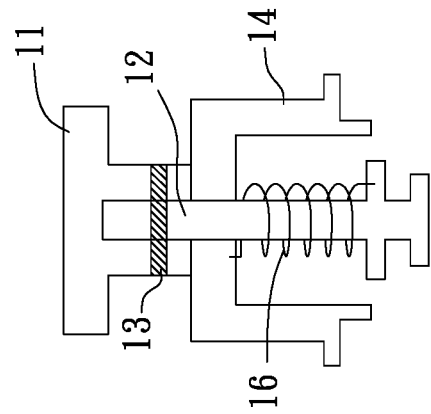
FIG. 24 is a cross-sectional view of embodiment 18 of the present disclosure.
Figure 23:
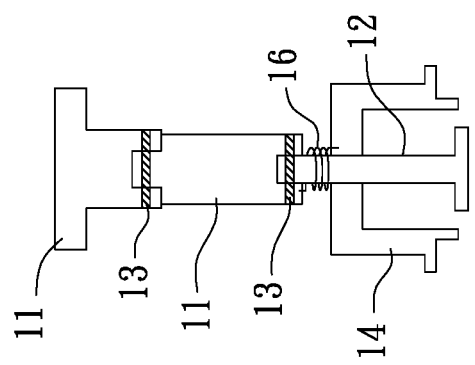
FIG. 23 is a cross-sectional view of embodiment 17 of the present disclosure.
Figure 22:
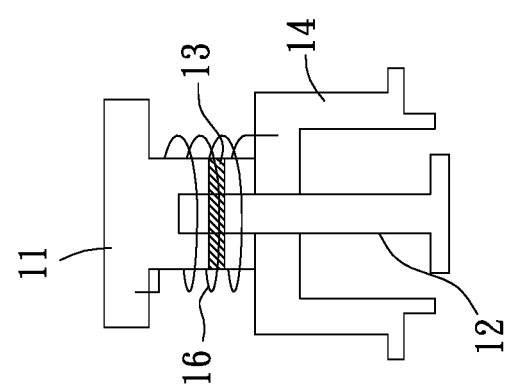
FIG. 22 is a cross-sectional view of embodiment 16 of the present disclosure.

Referring to FIG. 22 through FIG. 24, in this embodiment, the fastener structure 1 further comprises a torsion spring 16. The torsion spring 16 has one end blockedly disposed at the head portion 11 and the other end blocked at the body portion 14 (shown in FIG. 22 and FIG. 23). Alternatively, the torsion spring 16 has one end blockedly disposed at the body portion 14 and the other end blocked at the rod member 12 (shown in FIG. 24). Thus, the head portion 11 or the rod member 12 rotates to and fro because of resilience of the torsion spring 16. Therefore, the present disclosure meets practical operation-related and usage-related needs.

Figure 25:
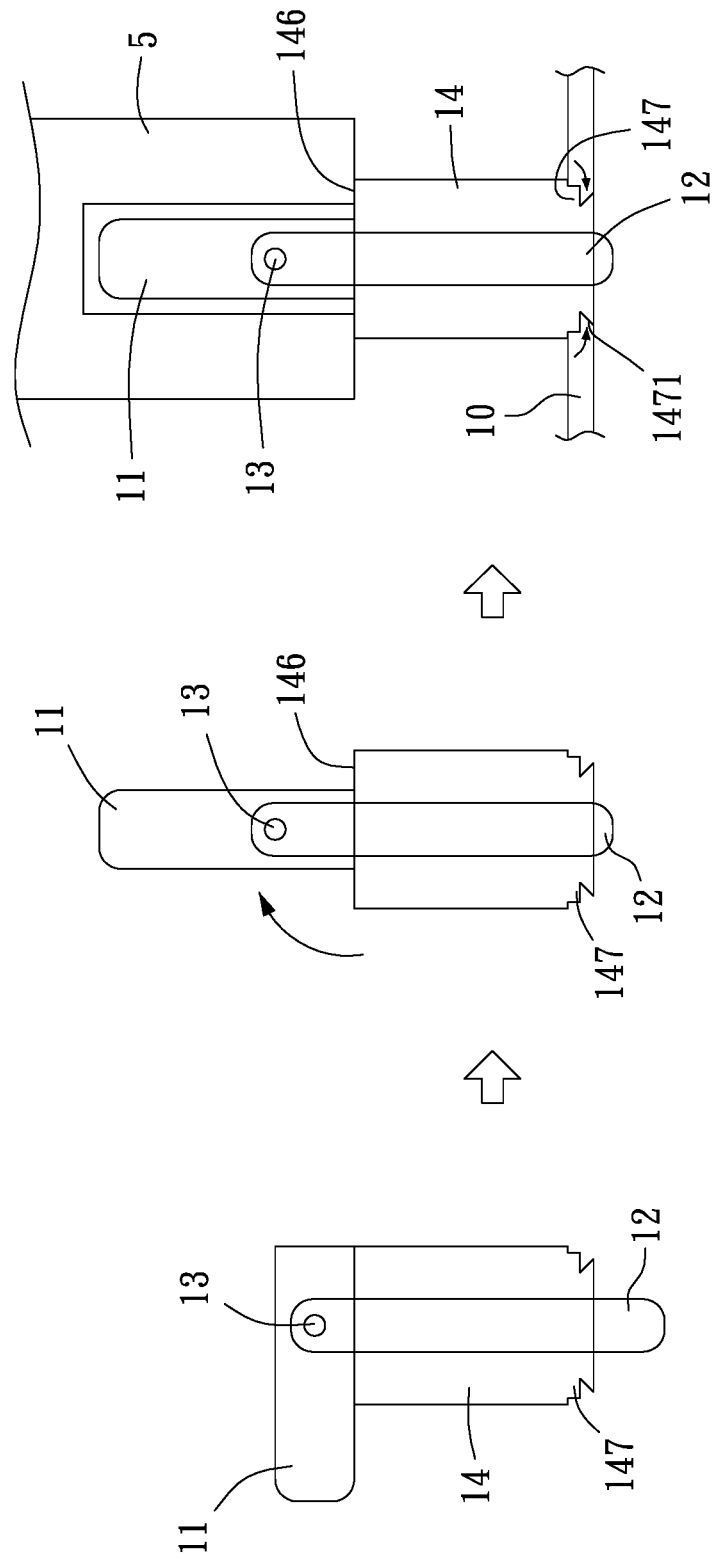
FIG. 25 is a schematic view of assembly state of embodiment 19 of the present disclosure.
Figure 26:
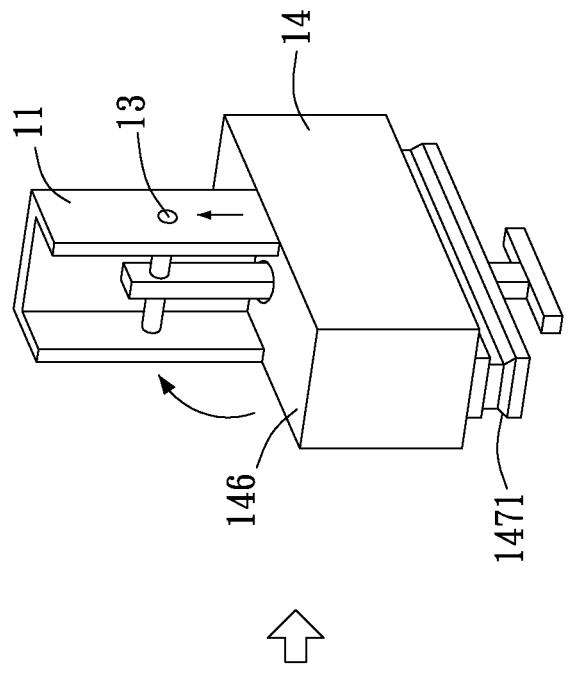
FIG. 26 is a schematic view of usage state of embodiment 20 of the present disclosure.
Figure 26:
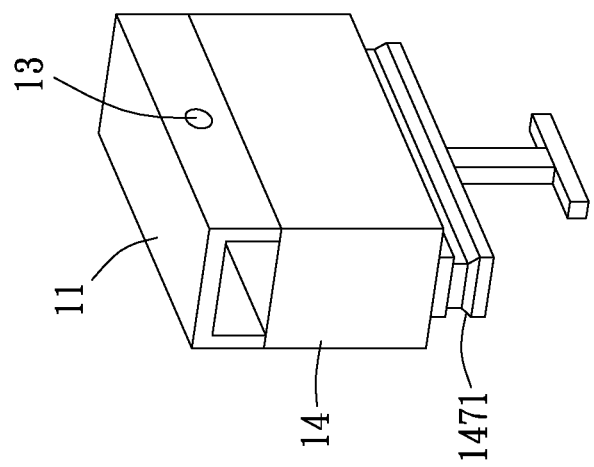

Referring to FIG. 25 and FIG. 26, in this embodiment, the pressed portion 146 is disposed beside the head portion 11, the rod member 12 and the fitting member 13 and is of a greater width than the head portion 11, the rod member 12 and the fitting member 13; thus, the head portion 11 rotates about the fitting member 13 to drive the rod member 12 moving and thereby creating the pressed space of the pressed portion 146. Consequently, a tool 5 has a recess to receive the head portion 11. The tool 5 directly presses or abuts against the pressed portion 146 under an applied force, such that a fitting portion 147 of the body portion 14 presses a first object 2. Therefore, the material of the first object 2 enters or flows into a material storage space 1471 of the fitting portion 147, thereby allowing the body portion 14 to be fitted to the first object 2. The body portion 14 is of greater hardness than the first object 2. Therefore, the body portion 14 is firmly fitted to the first object 2 to facilitate subsequent related operation. To operate the fastener structure, the user rotates the head portion 11 about the fitting member 13 to drive the rod member 12 moving and thereby being fastened to the second object or separating therefrom.

Figure 27:
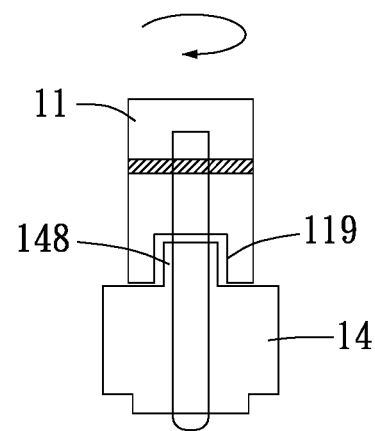
FIG. 27 is a cross-sectional view of embodiment 21 of the present disclosure.
Figure 28:
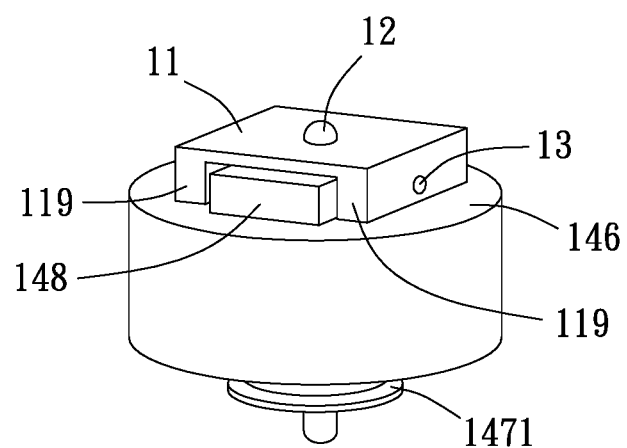
FIG. 28 is a perspective view of embodiment 21 of the present disclosure.
Figure 29:
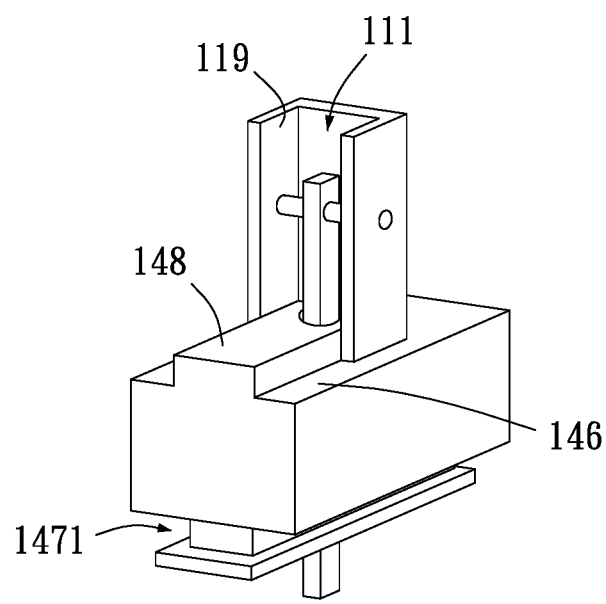
FIG. 29 is a perspective view of embodiment 22 of the present disclosure.

Referring to FIG. 27 and FIG. 29, in this embodiment, the head portion 11 has a blocking portion 119, and the body portion 14 has a corresponding blocking portion 148. The blocking portion 119 and the corresponding blocking portion 148 block each other to stop the head portion 11 rotating relative to the body portion 14 in a circumferential direction of the rod member 12. The blocking portion 119 and the corresponding blocking portion 148 are raised portion, dented portion, stepped portion, oblique surface portion, curved surface portion, arcuate surface portion or flatted surface portion Therefore, the present disclosure meets practical operation-related and usage-related needs.

Refer to FIG. 30 through FIG. 33 which illustrate this embodiment. The head portion 11 has a blocking portion 119. The body portion 14 has a corresponding blocking portion 148. The rod member 12 has a blocking portion 124. The body portion 14 has another corresponding blocking portion 149. The blocking portions 119, 124 and the corresponding blocking portions 148, 149 block each other to stop the rod member 12 rotating relative to the body portion 14 in a circumferential direction of the rod member 12.

Figure 30:
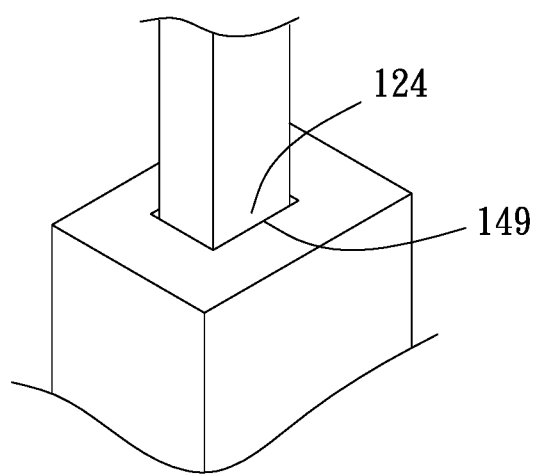
FIG. 30 is a perspective view of embodiment 23 of the present disclosure.
Figure 31:
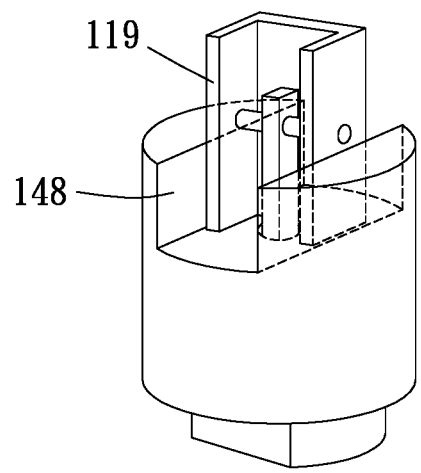
FIG. 31 is a perspective view of embodiment 24 of the present disclosure.
Figure 32:
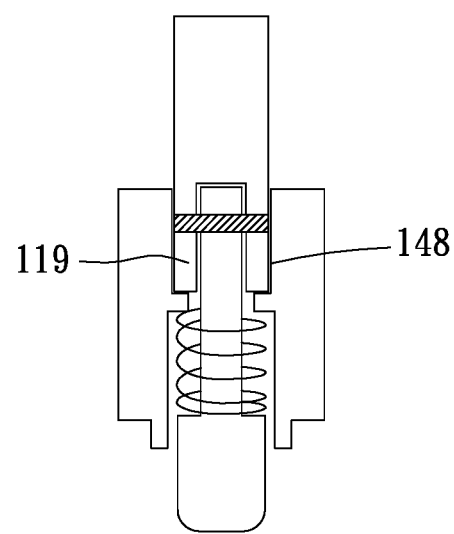
FIG. 32 is a schematic view of usage state of embodiment 25 of the present disclosure.
Figure 33:
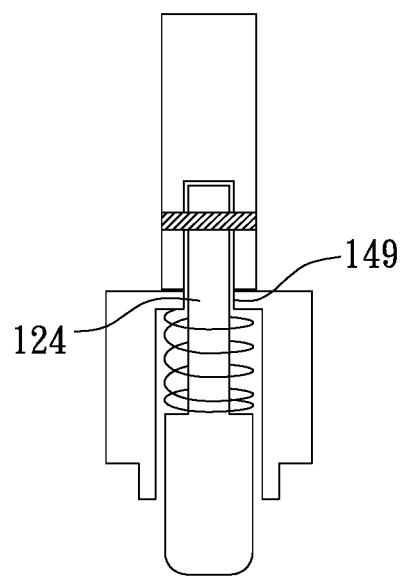
FIG. 33 is a schematic view of usage state of embodiment 26 of the present disclosure.
Figure 34:
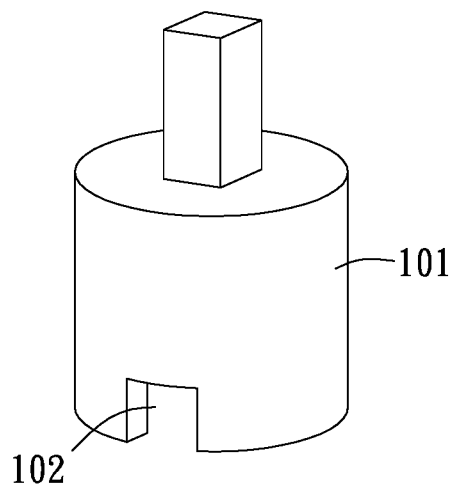
FIG. 34 is a perspective view of a tool according to embodiment 27 of the present disclosure.
Figure 35:
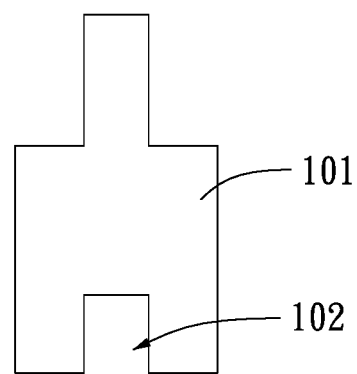
FIG. 35 is a schematic lateral view of the tool according to embodiment 27 of the present disclosure.
Figure 36:
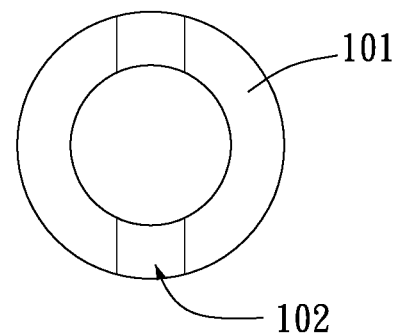
FIG. 36 is a schematic bottom view of the tool according to embodiment 27 of the present disclosure.
Figure 37:
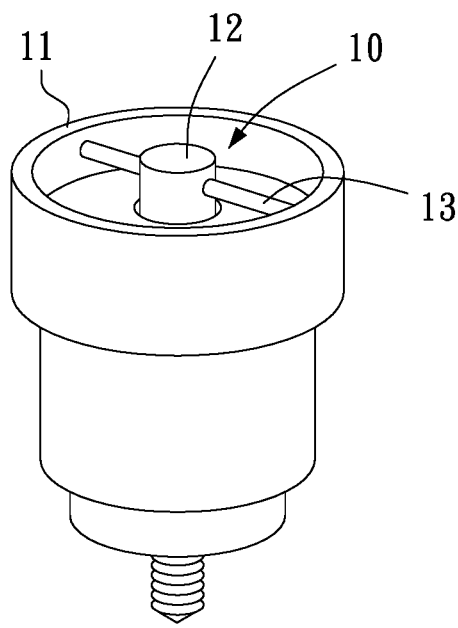
FIG. 37 is a perspective view of embodiment 28 of the present disclosure.
Figure 38:
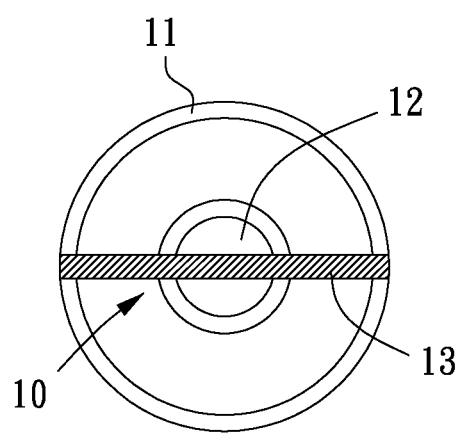
FIG. 38 is a schematic top view of embodiment 28 of the present disclosure.
Figure 39:
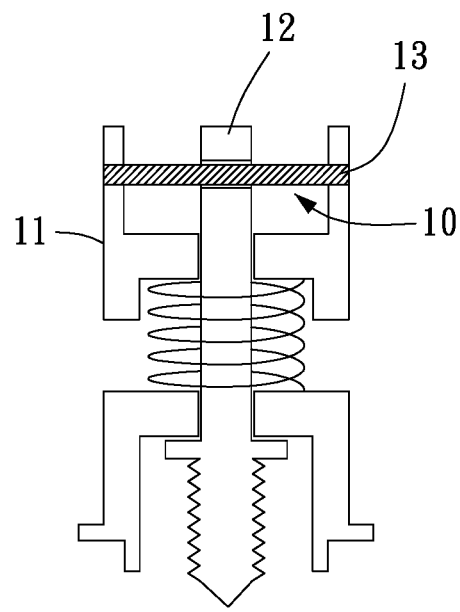
FIG. 39 is a schematic cross-sectional view of embodiment 28 of the present disclosure.
Figure 40:
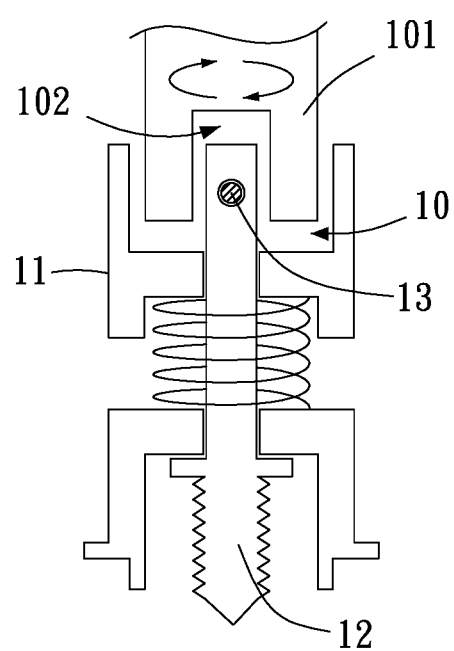
FIG. 40 is a schematic view of usage state of embodiment 28 of the present disclosure.

In an embodiment of the present disclosure, the blocking portions 119, 124 are tetrahedrons or polyhedrons, and the corresponding blocking portions 148, 149 are tetrahedrons or polyhedrons (shown in FIG. 30). Alternatively, the blocking portion 119 is a blocking raised member, and the corresponding blocking portion 148 is a corresponding blocking dented member (shown in FIG. 31, FIG. 32). Alternatively, the blocking portion 124 is a blocking dented member, and the corresponding blocking portion 149 is a corresponding blocking raised member (shown in FIG. 33).

Referring to FIG. 34 through FIG. 40, in this embodiment, the head portion 11 has a tool control portion 10. The tool control portion 10 comprises the rod member 12 and the fitting member 13 (shown in FIG. 37 through FIG. 39). The fastener structure 1 further comprises a tool 101. The tool 101 has a corresponding control portion 102 (shown in FIG. 34 through FIG. 36) corresponding in position to the tool control portion 10 to control the rod member 12 (shown in FIG. 40) of the fastener structure 1. The tool control portion 10 is the space within the head portion 11, disposed on two sides of the fitting member 13, and lower than the upper end of the head portion 11.

Figure 41:
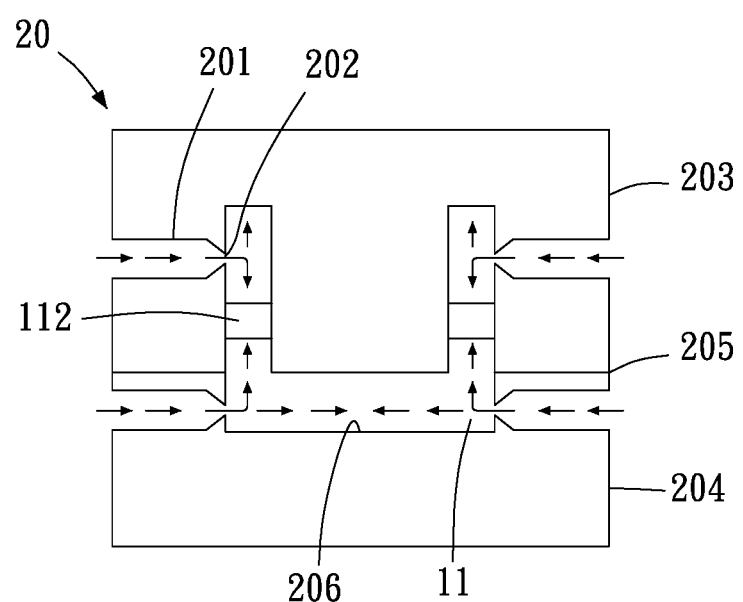
FIG. 41 is a schematic view of production state of embodiment 29 of the present disclosure.

Referring to FIG. 41, in this embodiment, the head portion 11 is formed with a mold 20 by intra-mold injection molding, including plastic intra-mold injection, metal intra-mold injection or nonmetal intra-mold injection. The mold 20 has a sprue 201, a gate 202, an upper mold 203 and a lower mold 204.

A mold closing portion 205 is disposed between the upper mold 203 and the lower mold 204. Liquid material is admitted into a hollow intra-mold head portion space 206 from the gate 202 and bypasses the holding portion 112 in the hollow intra-mold head portion space 206, and thus cooled and solidified to form the head portion 11 and the holding portion 112, the holding portion 112 is hollow.

While the present disclosure has been described by means of specific embodiments, numerous modifications and variations could be made thereto by those skilled in the art without departing from the scope and spirit of the present disclosure set forth in the claims.

What is claimed is:

1. A fastener structure, comprising:
   a head portion having a receiving portion and a holding portion;
   a rod member having an engaging portion and an attaching portion and penetratingly disposed at the receiving portion, the attaching portion corresponding in position to the holding portion; and
   a fitting member penetratingly disposed at the attaching portion and the holding portion, the head portion and the rod member are fixed to each other;
   wherein the fastener structure further comprises a body portion for use in movable fitting;
   wherein the head portion has a blocking portion, and the body portion has a corresponding blocking portion, such that the blocking portion and the corresponding blocking portion block each other to limit rotation or lateral movement of the head portion.

2. The fastener structure of claim 1, wherein the holding portion of the head portion has a recess portion for receiving an expanding portion or a stopping portion of the fitting member.

3. The fastener structure of claim 1, wherein the receiving portion of the head portion is a vertical, transverse or lateral penetrating hole or recess portion.

4. The fastener structure of claim 1, wherein the holding portion of the head portion or the attaching portion of the rod member is a lateral, vertical or transverse penetrating hole or recess portion.

5. The fastener structure of claim 1, wherein the body portion has a fitting portion adapted to be fitted to a first object or integrally formed with the first object.

6. The fastener structure of claim 5, wherein the fitting portion is fitted to the first object by riveting, expanding, welding, fastening, adhering or soldering.

7. The fastener structure of claim 1, wherein the head portion or the body portion has a checking portion for checking and being fitted to each other or checking and being fitted to the rod member.

8. The fastener structure of claim 1, further comprising a resilient component having an end abutting against the head portion and another end abutting against the body portion, or having an end abutting against the body portion and another end abutting against the rod member or the engaging portion.

9. The fastener structure of claim 1, wherein the rod member penetrates and exits an internal hole of the body portion, such that the attaching portion penetrates and exits the body portion, wherein, after the attaching portion has been fitted to the head portion, the fitting member is insertedly disposed in the attaching portion for fitting, such that the rod member is movably fitted to the body portion.

10. The fastener structure of claim 1, wherein the body portion has a pressed portion adapted to be pressed or pushed, such that a fitting portion of the body portion presses or abuts against a first object, allowing material of the first object to enter or flow into a material storage space of the fitting portion, so as for the body portion to be fitted to the first object.

11. The fastener structure of claim 10, wherein the body portion is of greater hardness than the first object.

12. The fastener structure of claim 10, wherein the pressed portion is disposed beside the head portion, the rod member or the fitting member and is of a greater width than the head portion, the rod member or the fitting member.

13. The fastener structure of claim 10, wherein the head portion rotates about the fitting member to drive the rod member moving and thereby creating pressed space of the pressed portion.

14. The fastener structure of claim 1, wherein the body portion has a pressed portion adapted to be pressed or pushed, such that a fitting portion of the body portion is expanded and fitted to a first object when pressed under an applied force.

15. The fastener structure of claim 14, wherein the pressed portion is disposed beside the head portion, the rod member or the fitting member and is of a greater width than the head portion, the rod member or the fitting member.

16. The fastener structure of claim 14, wherein the head portion rotates about the fitting member to drive the rod member moving and thereby creating pressed space of the pressed portion.

17. The fastener structure of claim 1, wherein the fastener structure is disposed in a carrier, taken out of the carrier with a tool, compared with a comparison device, and precisely placed on a first object for fitting.

18. The fastener structure of claim 17, wherein the tool is a vacuum suction device or a clamp, and the first object is a PCB, a metal board or a plastic board.

19. The fastener structure of claim 17, wherein the tool is a vacuum suction device, and the head portion is an airtight structure disposed above the rod member, such that the fastener structure is attracted to the vacuum suction device by suction.

20. The fastener structure of claim 1, wherein the head portion or the body portion of the fastener structure has a weldable surface weldable to a weldable surface of the first object.

21. The fastener structure of claim 1, wherein solder portions are disposed between the body portion and the first object and adapted to be heated to change to a liquid state and then cooled to change to a solid state, such that the body portion and the first object are fitted to each other.

22. The fastener structure of claim 1, further comprising a torsion spring having an end blocked at the head portion and another end blocked at the body portion, or having an end blocked at the body portion and another end blocked at the rod member, such that the head portion or the rod member rotates to and fro because of resilience of the torsion spring.

23. The fastener structure of claim 1, wherein the head portion rotates about the fitting member to drive the rod member moving.

24. The fastener structure of claim 1, wherein the head portion has a tool control portion comprising the rod member and the fitting member.

25. The fastener structure of claim 24, wherein the tool control portion is a space within the head portion and disposed on two sides of the fitting member.

26. A fastener structure, comprising:
  a head portion having a receiving portion and a holding portion;
  a rod member having an engaging portion and an attaching portion and penetratingly disposed at the receiving portion, the attaching portion corresponding in position to the holding portion; and
  a fitting member penetratingly disposed at the attaching portion and the holding portion;
  a body portion being movably fitted to the head portion; and
  a tool having a recess to receive the head portion, the tool directly presses or abuts against the body portion.

27. The fastener structure of claim 26, wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

28. A fastener structure, comprising:
  a head portion having a receiving portion and a holding portion;
  a rod member having an engaging portion and an attaching portion and penetratingly disposed at the receiving portion, the attaching portion corresponding in position to the holding portion; and
  a fitting member penetratingly disposed at the attaching portion and the holding portion;

wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

29. A fastener structure, comprising:
a head portion having a receiving portion and a holding portion;
a rod member having an engaging portion and an attaching portion and penetratingly disposed at the receiving portion, the attaching portion corresponding in position to the holding portion;
a fitting member penetratingly disposed at the attaching portion and the holding portion; and
a body portion being movably fitted to the head portion;
wherein the head portion has a blocking portion, and the body portion has a corresponding blocking portion, such that the blocking portion and the corresponding blocking portion block each other to stop the head portion rotating relative to the body portion in a circumferential direction of the rod member.

30. The fastener structure of claim 29, wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

31. A fastener structure, comprising:
a head portion having a receiving portion and a holding portion;
a rod member having an engaging portion and an attaching portion and penetratingly disposed at the receiving portion, the attaching portion corresponding in position to the holding portion;
a fitting member penetratingly disposed at the attaching portion and the holding portion; and
a body portion being movably fitted to the head portion;
wherein the rod member has a blocking portion, and the body portion has a corresponding blocking portion, such that the blocking portion and the corresponding blocking portion block each other to stop the rod member rotating relative to the body portion in a circumferential direction of the rod member.

32. The fastener structure of claim 31, wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

33. A fastener structure, comprising:
a head portion having a receiving portion and a holding portion;
a rod member having an engaging portion and an attaching portion and penetratingly disposed at the receiving portion, the attaching portion corresponding in position to the holding portion;
a fitting member penetratingly disposed at the attaching portion and the holding portion;
a body portion being movably fitted to the head portion; and
a tool directly pressing or abutting against the body portion.

34. The fastener structure of claim 33, wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

35. A fastener structure, comprising:
a head portion having a receiving portion and a holding portion;
a rod member having an engaging portion and an attaching portion and penetratingly disposed at the receiving portion, the attaching portion corresponding in position to the holding portion; and
a fitting member penetratingly disposed at the attaching portion and the holding portion, the head portion rotates about the fitting member;
a body portion being movably fitted to the head portion; and
a tool having a recess to receive the head portion, the tool directly presses or abuts against the body portion.

36. The fastener structure of claim 35, wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

37. A fastener structure, comprising:
a head portion having a receiving portion and a holding portion;
a rod member having an engaging portion and an attaching portion and penetratingly disposed at the receiving portion, the attaching portion corresponding in position to the holding portion;
a fitting member penetratingly disposed at the attaching portion and the holding portion, the head portion rotates about the fitting member; and
a body portion being movably fitted to the head portion;
wherein the head portion has a blocking portion, and the body portion has a corresponding blocking portion, such that the blocking portion and the corresponding blocking portion block each other to stop the head portion rotating relative to the body portion in a circumferential direction of the rod member.

38. The fastener structure of claim 37, wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

39. A fastener structure, comprising:
- a head portion having a receiving portion and a holding portion;
- a rod member having an engaging portion and an attaching portion and penetratingly disposed at the receiving portion, the attaching portion corresponding in position to the holding portion; and
- a fitting member penetratingly disposed at the attaching portion and the holding portion, the head portion and the rod member are fixed to each other;
- wherein the fastener structure further comprises a body portion for use in movable fitting;
- wherein the rod member has a blocking portion, and the body portion has a corresponding blocking portion, such that the blocking portion and the corresponding blocking portion block each other to limit rotation or lateral movement of the head portion.

40. A fastener structure, comprising:
- a head portion having a receiving portion and a holding portion;
- a rod member having an engaging portion and an attaching portion and penetratingly disposed at the receiving portion, the attaching portion corresponding in position to the holding portion; and
- a fitting member penetratingly disposed at the attaching portion and the holding portion, the head portion and the rod member are fixed to each other;
- wherein the head portion is formed by intra-mold injection molding, including plastic intra-mold injection, metal intra-mold injection or nonmetal intra-mold injection, wherein a mold has a sprue and a gate, and liquid material is admitted into a hollow intra-mold head portion space from the gate and bypasses the holding portion in the hollow intra-mold head portion space, and thus cooled and solidified to form the head portion and the holding portion, the holding portion is hollow.

* * * * *